the accompanying drawing illustrating diagrammatically
United States Patent Office 3,411,371
Patented Nov. 19, 1968

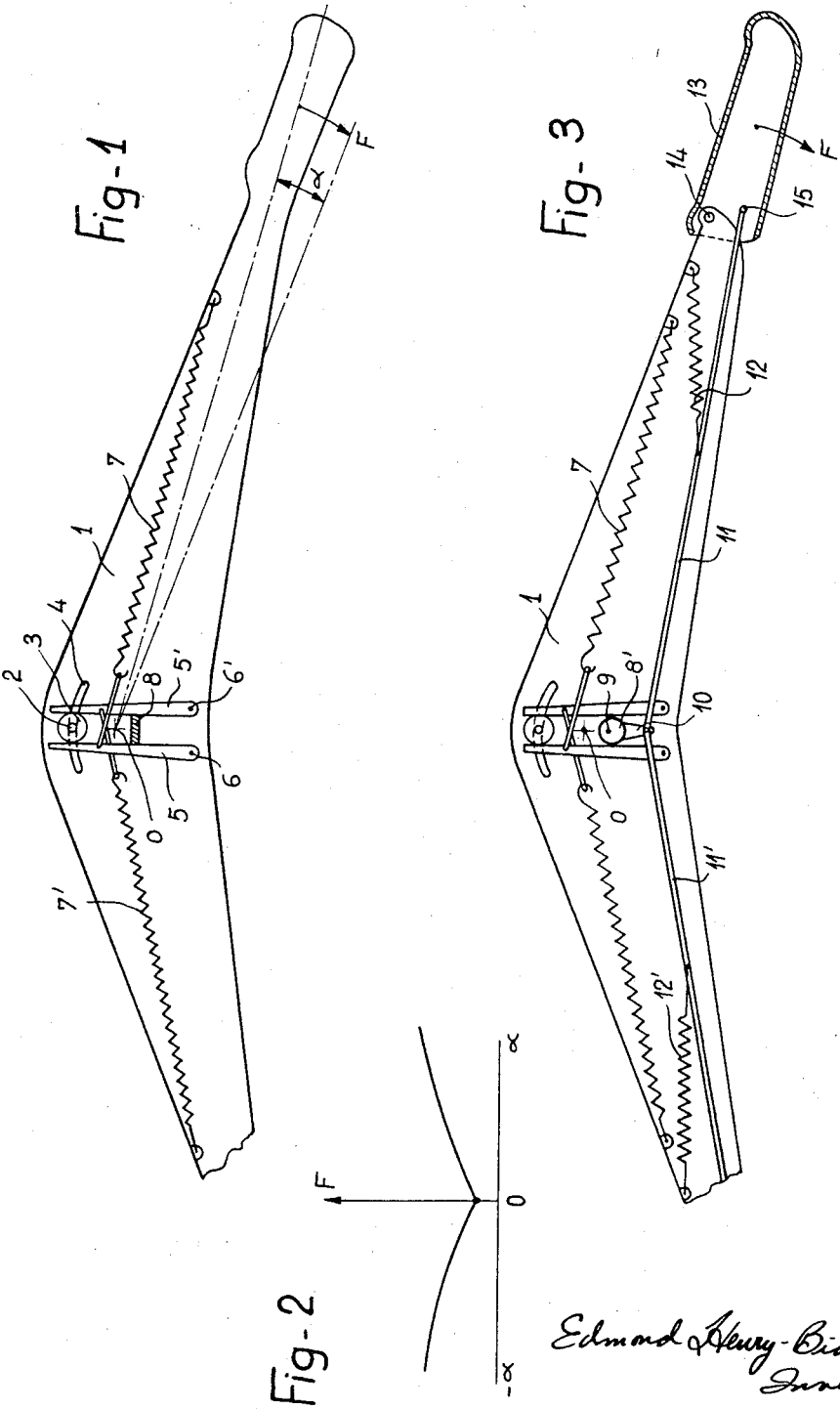

3,411,371
STEERING DEVICES OF AUTOMOTIVE VEHICLES
Edmond Henry-Biabaud, Paris, France, assignor to Societe Anonyme André Citroen, Paris, France, a French corporation
Filed June 28, 1966, Ser. No. 561,889
Claims priority, application France, July 30, 1965, 26,678
3 Claims. (Cl. 74—495)

ABSTRACT OF THE DISCLOSURE

Steering device for a vehicle having a steering column with a rudder mounted on the steering column having a stop member coincident with the rudder pivot axis. Two levers are pivoted on the central portion of the rudder and bear against the stop member. Two tension springs are disposed symmetrically between a point adjacent to the free end of the rudder and one of the levers. A fixed roller independent of the rudder is engaged by the two levers so that the springs will exert equal tractive efforts in opposite directions on the rudder whereby to rotate the rudder a force capable of compensating that of said antagonistic springs must be exerted on one end of the rudder.

---

This invention relates in general to steering arrangements of automotive vehicles and has specific reference to a rudder-type steering control device.

It is the object of this invention to provide a device of this character which is intended for use in a steering system equipped with servo means, whereby a resistance proportional to the steering angle can be obtained.

Devices capable of producing the same result are already known to those conversant with the art. Thus, in U.S. Patents No. 3,171,298 of Mar. 2, 1965, 3,183,992 of May 18, 1965, applications Serial Number 501,377 of Oct. 22, 1965, and 501,398 of October 1965, now Patent Nos. 3,373,631 and 3,339,372, respectively, there is described a device consisting of a cam driven from the steering wheel and engaged by a small roller follower urged by a piston slidably mounted in a cylinder. This cylinder is connected to an apparatus giving a fluid pressure proportional to the speed of the vehicle; obviously, in this case the steering reduction ratio is immaterial and this arrangement provides a very direct steering effect whereby conventional steering wheels can be replaced by a handlebar or rudder of any suitable configuration.

However, this solution is not completely satisfactory when it is desired to drive the vehicle straight ahead and to correct only the lateral deflection of tires which is due to external forces or forces created by the driver himself by applying unintentional impulses to the steering wheel or member. In this case, the necessary steering correction is of very low amplitude and yet must be obtained with a high degree of precision to prevent the vehicle from wandering along a sinusoidal path.

Now one of the difficulties to be eliminated in order to obtain a strictly rectilinear path lies in the fact that the efforts to be exerted on the steering wheel for producing the necessary corrections are so moderate that it is extremely delicate for the driver to properly proportion these efforts. Thus, in a conventional vehicle straight-line corrections are less than 30 mm. on the rim of the steering wheel with a standard steering box ratio.

If the reduction ratio were ten times more direct, the correction would be of the order of 3 mm., but obviously this correction could be dangerous in the case of unskilled drivers.

Under these conditions it appears that a good proposition would be to keep the reduction ratio of the steering mechanism to a value at least equal to and preferably higher than the values now in current use, but only in the very beginning of the steering movement, within a very reduced angular amplitude which, to give an idea of its magnitude, is of the order of $\pm 1°$ of the road wheel steering. The change from a high reduction ratio to a lower reduction ratio is not necessarily gradual, but the increment in the effort demanded to the driver must necessarily be very progressive in order to avoid any interference in the driving action. Therefore, this invention is concerned with a steering device capable of meeting these requirements, which consists of a rudder secured to the end of the steering column and comprising two tension springs disposed symmetrically each between a point located near the free end of an arm and a lever pivoted on the central portion of the rudder and adapted to bear against a stop member rigid with the rudder and coincident with the rudder axis, these two levers further engaging a common fixed roller independent of said rudder, so that said tension springs exert equal stresses in opposite directions on said rudder, whereby to rotate the rudder in one or the other direction a force capable of balancing the relevant antagonistic spring must be exerted on one end of said rudder.

Moreover, according to a preferred form of embodiment of the present invention, said stop member consists of a rotatably mounted eccentric actuatable by rods having their ends pivoted respectively on handles pivoted in turn to the ends of said rudder, said rods being responsive to return springs attached to said rudder.

In order to afford a clearer understanding of this invention and of the manner in which the same may be carried out in practice, reference will now be made to by way of example typical forms of embodiment of the invention. In the drawing:

FIGURE 1 is a diagrammatic plan view showing a first form of embodiment of the steering device constituting the subject-matter of this invention;

FIGURE 2 is a diagram plotting the stress against the steering angle in the case of the device illustrated in FIGURE 1;

FIGURE 3 is a diagrammatic plan view of another form of embodiment;

Figure 4:
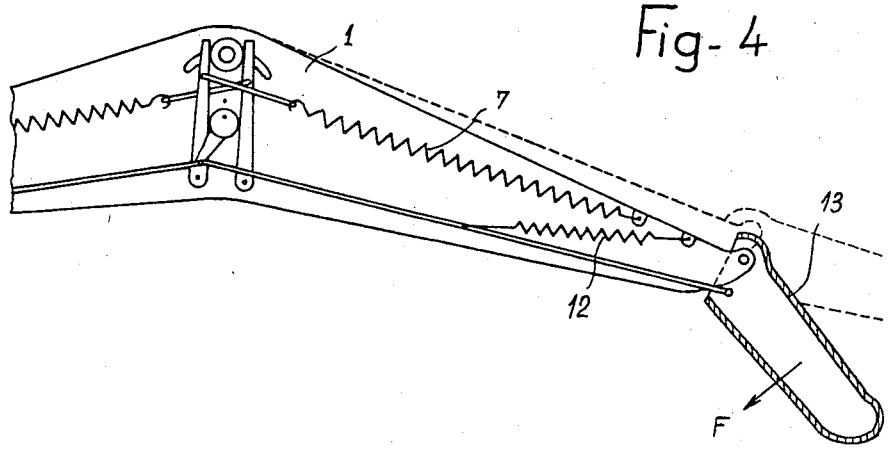
FIGURES 4 and 5 are diagrammatic views of the arrangement shown in FIGURE 3, in different operating positions.

In the device illustrated in FIGURE 1, the rudder 1 is mounted on a steering column centered on an axis O. A pivot pin 2 carrying a roller 3 is rigid with the body of the vehicle and therefore constitutes a fixed point. The rudder 1 is adapted to pivot about the axis O, the pivot pin 2 extending through an elongated hole 4 formed in the rudder 1. Two levers 5 and 5' pivoted at 6 and 6' respectively on the rudder 1 are urged by tension springs 7 and 7' against the roller 3 and simultaneously, without play, against the stop member 8 rigid with rudder 1, the opposite ends of these tension springs being attached to the outer end of the opposite arm of the rudder, with respect to the roller, as shown.

With this arrangement it is obvious that if a force is exerted in the direction F (FIGURE 1) on the end of an arm, the latter will necessarily create at O a torque at least equal to that exerted by the spring 7 through the medium of lever 5 bearing against the roller 3, before the rudder is moved angularly, the tension of spring 7' remaining practically unchanged during the rudder rotation. The curve of the stress F as a function of the angle α is shown in FIGURE 2, this stress adding itself to that resulting from the steering proper.

It will be noted that the effort to be exerted may be varied at will by simply moving the stop member 8 to the right or to the left. This movement may be obtained automatically by constructing the rudder in the manner illustrated diagrammatically in FIGURE 3.

In this form of embodiment the stop member 8 is replaced by an eccentric 8' fulcrumed on a pivot pin 9 rigid with the rudder. The angular motion of this eccentric 8' is obtained by means of a lever 10 controlled by a pair of rods 11 and 11', attached at 15 and 15' to the handles 13 and 13' pivoted at 14 and 14' on the rubber 1. The eccentric 8' is normally held in its neutral position of equilibrium, in the absence of any action exerted on the handles 13 and 13', by the antagonistic tensions of springs 12 and 12' having one end attached to the outer end of the corresponding arm and the other end attached to an intermediate point of the relevant rod 11, 11'.

The effort necessary to move the handles 13 and 13' about their pivot pins 14 and 14' is initially zero, since the springs 12 and 12' compensate each other, but increases as a function of the angular amplitude. The diagram of springs 12 and 12' must be calculated to produce, before the handles attain their maximum angular position, a pivoting torque of rudder 1 which is equal to the return force exerted by the springs 7. This is the requirement to be met for imparting the desired progressiveness of the steering effort.

Figure 5:
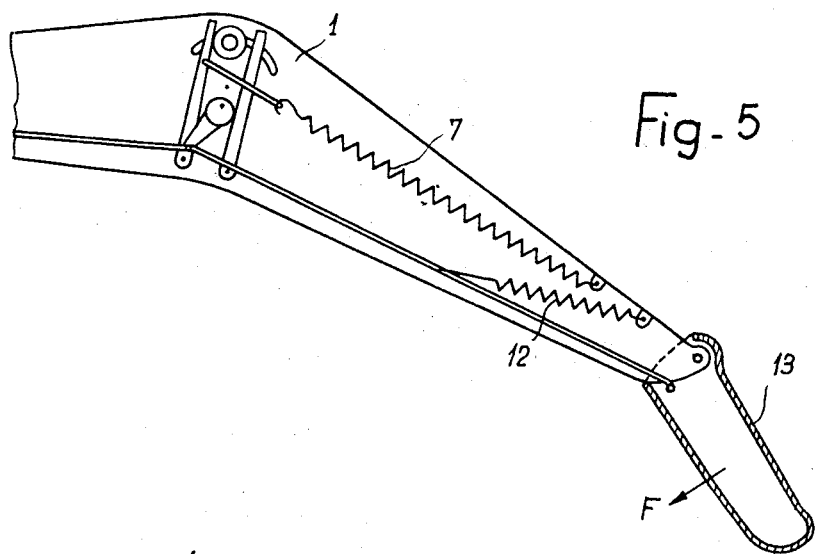

In FIGURE 4, it will be seen that the relative angular movement of the handle with respect to the rudder will modify the position of the stop member associated with levers 5 and 5'. It is obvious that a relatively considerable stepdown ratio between the handle and the bearing points of levers 5 and 5' may be obtained, if desired. When driving along a straight line, the driver controls the vehicle by simply moving the handles, thus providing a high reduction ratio (effective for example on ±2° of the wheel steering). When a more direct steering action is necessary, the driver continues to exert his effort on the handles and beyond a predetermined torque value no relative rotary movement takes place between the handles and the rudder. As already explained hereinabove, the change from one reduction ratio to another is not attended by any variation in the steering effort, and eventually the position illustrated in FIGURE 5 is attained.

This continuity in the steering effort does not interfere in any way with the driving, and the change in the reduction ratio takes place at very reduced steering angles. However, if this were deemed necessary, a certain progressiveness in the change of reduction ratio may be obtained by substituting a suitably designed cam for the eccentric 8.

Figure 6:
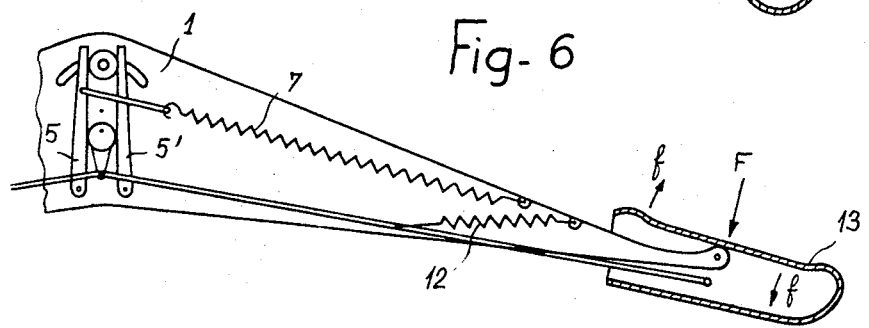
FIGURE 6 is a diagrammatic plan view of another form of embodiment.

As already explained hereinabove, the effort necessary for moving the handles 13 and 13' is initially zero. During the drive, the driver's hands hold the two handles and under these conditions it is clear that it is the difference between the efforts applied by his hands that will cause a slight steering effect. The latter is easily controllable since a relatively high reduction ratio is preserved about the straight-line position; however, if the driver's arms are not properly supported, for example by bearing on the arm-rests, the driver may find it more or less difficult to balance the weight of his two arms on the handles. The device illustrated in FIGURE 6 permits of eliminating the possibly detrimental influence exerted by the weight of the driver's hands when driving along a straight line; the pivot axis 14 of the right-hand handle is positioned at mid-length thereof; thus, the weight of the hand, or parasitic forces resulting from the vehicle motion will not interfere with, or influence, the steering, since the springs 7 acting through the medium of levers 5 create a relatively high centering torque. Precise variations about a straight course are obtained by rotating (see arrow f) about the pivot pin 14 in the desired steering direction. As in the preceding devices, the angular movement of handle 13 with respect to the rudder will develop, beyond a predetermined angular position, a pivoting torque of rudder 1 which is higher than the return or reaction torque produced by the springs 7.

I claim:

1. Steering device for a vehicle comprising a steering column, a rudder mounted on said steering column having a stop member coincident with the rudder pivot axis, two levers pivoted on the central portion of said rudder and bearing against said stop member, two tension springs disposed symmetrically between a point adjacent to the free end of said rudder and one of said levers, a fixed roller independent of said rudder, said two levers engaging said roller so that said springs will exert equal tractive efforts in opposite directions on said rudder, whereby to rotate said rudder a force capable of compensating that of said antagonistic springs must be exerted on one end of said rudder.

2. Device according to claim 1 wherein said stop member comprises a rotatably mounted eccentric actuatable by means of rods having their ends pivoted on handles pivotally mounted on said rudder ends, said rods being responsive to tension springs attached to said rudder.

3. Device according to claim 2 wherein said rods are pivoted respectively on the central portion of the handles each fulcrumed at a point of said central portion on one end of said rudder.

References Cited

UNITED STATES PATENTS

| 496,388 | 5/1893 | Adams | 280—270 |
| 2,087,535 | 7/1937 | Dall | 280—272 |
| 2,756,610 | 7/1956 | Hibbard | 74—470 |

FRED C. MATTERN, Jr., *Primary Examiner.*

B. T. CALLAHAN, *Assistant Examiner.*